(12) United States Patent
Tallman

(10) Patent No.: US 8,113,232 B1
(45) Date of Patent: Feb. 14, 2012

(54) FLOOD PREVENTION SYSTEM AND ASSOCIATED METHOD

(76) Inventor: Eric Tallman, Columbia, MD (US)

( * ) Notice: Subject to any disclaimer, the term of this patent is extended or adjusted under 35 U.S.C. 154(b) by 825 days.

(21) Appl. No.: 12/221,639

(22) Filed: Aug. 5, 2008

Related U.S. Application Data

(60) Provisional application No. 60/963,459, filed on Aug. 6, 2007.

(51) Int. Cl.
 *F16K 17/00* (2006.01)
(52) U.S. Cl. .......................... 137/460; 137/499
(58) Field of Classification Search .............. 137/456, 137/459, 460, 487.5, 494, 499, 551; 73/861.74–861.79
 See application file for complete search history.

(56) References Cited

U.S. PATENT DOCUMENTS

| | | | | |
|---|---|---|---|---|
| 1,557,863 A * | 10/1925 | Mrvosh | | 137/460 |
| 5,566,715 A | 10/1996 | Griffin | | |
| 5,694,962 A * | 12/1997 | Kim | | 137/2 |
| 5,771,920 A * | 6/1998 | Jewett et al. | | 137/460 |
| 5,893,388 A * | 4/1999 | Luker | | 137/456 |
| 6,026,838 A * | 2/2000 | Nicewonger et al. | | 137/2 |
| 6,119,720 A * | 9/2000 | Isaacson et al. | | 137/459 |
| 6,125,868 A | 10/2000 | Murphy | | |
| 6,701,956 B1 | 3/2004 | Berger | | |
| 7,509,975 B2 * | 3/2009 | Hodge et al. | | 137/456 |
| 2002/0088491 A1 * | 7/2002 | Yanagisawa et al. | | 137/456 |

* cited by examiner

*Primary Examiner* — Craig Schneider
*Assistant Examiner* — Jessica Cahill

(57) ABSTRACT

A water flow control system for regulating water traveling through an existing water supply line preferably includes a housing connected to an existing water line. A user interface may be coupled thereto and remotely attached. A mechanism may automatically prevent water from flowing through the housing upon detection of a triggering event. A controller may be situated within the housing along with motion sensors. A rotatable fan may be situated within the housing along with a plurality of tracks, triggers, and resilient spring members anchored to the triggers and tracks respectively. The rotation speed of the fan may be commensurate with the real-time water flow rate of the water flowing through the housing. A control logic algorithm operates to close a restrictor valve if the water flow rate exceeds limits set by the user interface. A manually-actuated lever may also be attached to open or close the restrictor valve.

12 Claims, 4 Drawing Sheets

FLOOD PREVENTION SYSTEM AND ASSOCIATED METHOD

CROSS REFERENCE TO RELATED APPLICATIONS

This application claims the benefit of U.S. Provisional Application No. 60/963,459, filed Aug. 6, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to water valves and, more particularly, to a water flow control system for regulating water traveling through an existing water supply line.

2. Prior Art

Ruptured water lines and malfunctioning equipment connected to water lines can result in serious flooding to the interior of a building or home. The flooding generally occurs when the equipment or building is unoccupied by anyone who can detect the accumulation of water and shut off the water supply to the building. Because it is not always possible to have a person supervising equipment or within the building twenty-four hours a day, it would be desirable to have a valve assembly installed within the water lines of the building that would prevent the flow of water through the water line once a flow period through the line exceeds a predetermined interval. It would be a further benefit if the valve was easily connectable with the waterline input of an appliance such as a dishwasher or washing machine. It would also be desirable if the user could adjust the predetermined flow interval to accommodate specific appliances or waterlines.

U.S. Pat. No. 5,566,715 to Griffin discloses a flood prevention valve installable in connection with the water lines of a building that prevents the flow of water through the water line once a flow period exceeds a predetermined period. The valve may be equipped with a phone notification system in electrical connection with a timer circuit that is capable of dialing a preset phone number and transmitting a message to a receiving station at a remote location. Unfortunately, this prior art reference does not provide a manual means for toggling the restrictor valve between open and closed positions should the automatic valve stop functioning.

U.S. Pat. No. 6,125,868 to Murphy discloses a method and apparatus for maintaining valves in a water distribution system. The apparatus affects an efficient maintenance program for the valves by recording information relating to each valve inspected. Computers are used to store and sort information regarding condition and location of each valve in the system to make repairs in an efficient manner. Signals inform the computer system as to the number of times the valves are opened and closed and relative wear caused. Unfortunately, this prior art does not provide a system that may be easily adapted to fit various water lines of household appliances.

U.S. Pat. No. 6,701,956 to Berger discloses a water control device including a housing, and as one unit, an inlet port and an exit port for flow therethrough of water, and a water meter mounting flange and a water flow control valve seat member in fluid communication with each other and with at least one of the inlet and outlet ports, and a water meter sealingly attached to the water meter mounting flange, and a water flow control valve sealingly attached to the water flow control valve seat member. Unfortunately, this prior art reference does not disclose a user interface capable of remote placement to allow a user to adjust the valve in a convenient location.

Accordingly, a need remains for a water flow control system in order to overcome the above-noted shortcomings. The present invention satisfies such a need by providing a system that is convenient and easy to use, is durable yet lightweight in design, is versatile in its applications, and provides users with a much needed system that can be instrumental in regulating water traveling through an existing water supply line.

BRIEF SUMMARY OF THE INVENTION

In view of the foregoing background, it is therefore an object of the present invention to provide a system for regulating water traveling through an existing water supply line. These and other objects, features, and advantages of the invention are provided by a water flow control system.

A water flow control system for regulating water traveling through an existing water supply line preferably includes a housing adapted to be in fluid communication with the existing water supply line and an existing external power supply. The system may be manufactured to adapt to a variety of water lines so that a user may use the system with dishwashers, washing machines, ice makers and the like. The system further may include a user interface communicatively coupled to the housing and the existing external power supply. Such a user interface may be situated exterior of the housing and spaced therefrom. The interface may be advantageously placed on an interior wall of the building to allow a user to conveniently set the water supply settings without having to crawl into tight spaces or under cabinets to adjust or shut off the water supply.

Additionally, the system may include a mechanism for automatically preventing water from flowing downstream of the housing upon detection of at least one triggering event. A first triggering event may be detected when the external power supply is interrupted. The system may further include a second triggering event preferably programmable and selectively adjusted based upon a user input. Such a second triggering event may be detected when a real-time water flow rate exceeds a maximum threshold water flow rate within the existing water supply line.

The automatic water flow preventing mechanism may include a controller situated within the housing and may be communicatively coupled to the user interface. In addition, a plurality of motion sensors may be situated within the housing and may be communicatively coupled to the controller. Further, the user interface may generate a calibration signal based upon receipt of a user input for adjusting the maximum threshold water flow rate associated with the second triggering event. This permits the user to selectively modify the maximum threshold water flow rate as desired.

The automatic water flow preventing mechanism further may include a rotatable fan situated within the housing and adapted to be centrally aligned along a travel path of the water flowing within the existing water supply line. Such a fan preferably includes a plurality of rotatable blades equidistantly offset from a center of the fan. Additionally, a plurality of tracks may be formed within the housing and oppositely spaced apart from a rotational path of the blades. Also, a plurality of triggers may be slidably attached to the tracks respectively.

Further, a plurality of resilient spring members preferably are included and have first and second ends anchored to the triggers and a corresponding end of the tracks respectively. The fan may be caused to rotate as water flows downstream of the housing along the travel path such that a rotational speed of the fan is commensurate with the real-time water flow rate. The blades may sequentially engage the triggers while traveling along the rotational path, thereby linearly urging the triggers along mutually exclusive longitudinal paths registered parallel to the travel path. In addition, the spring members may be reciprocated between compressed and equilibrium positions such that the triggers are automatically returned to a resting position after being linearly urged to a displaced position.

The automatic water flow preventing mechanism further may include a motor situated within the housing and may be communicatively coupled to the controller. In addition, a restrictor valve may be situated within the housing and may be disposed downstream of the triggers respectively. Such a restrictor valve may be driven by the motor. Also, a voltage level sensor may be electrically coupled to the existing external power supply. The voltage level sensor may generate true and false voltage level signals when the existing external power supply is uninterrupted and interrupted respectively.

The controller may include a processor and a memory electrically coupled to the processor. Such a memory may include programmable software instructions including a control logic algorithm that causes the motor to automatically drive the restrictor valve along a linear path traversing the travel path of water. Additionally, the motion sensors may be positioned along the longitudinal paths to thereby detect a number of times a corresponding one of the triggers is linearly urged along the longitudinal paths. The motion sensors generate a detection signal upon detecting linear movement of the triggers respectively.

The control logic algorithm may include and execute the steps of preferably first requesting receipt of the voltage level signal. Next, the algorithm may determine whether the voltage level signal is true or false. If the voltage level signal is true, the algorithm may next include the step of requesting a user to set the maximum threshold flow rate to a desired level via the user interface.

A fourth step of the algorithm may include continuously requesting receipt of the detection signals from the motion sensors. Fifth, the algorithm may calculate an average number of times that the triggers have been linearly urged along the longitudinal paths within a selected time interval. Sixth, the algorithm may calculate the real-time water flow rate by dividing the average number of times that the triggers have been linearly urged along the longitudinal paths by the selected time interval. Finally, if the real-time water flow rate is greater than the maximum threshold water flow rate, then the algorithm may generate and transmit a control signal to the motor for displacing the restrictor valve to a closed position. The algorithm thereby operates the valve to prevent an overflow of water based on the maximum level of water the user finds allowable.

The automatic water flow preventing mechanism further may include a manually-actuated lever operably attached to the restrictor valve and protruding outwardly from the housing. Such a lever may be selectively pivoted between raised and lowered positions for causing the restrictor valve to toggle between the open and closed positions respectively.

The lever thereby operates as a backup system, necessary should any problem occur with the electrical components of the valve or the power source. The automatic water flow preventing mechanism further may include a display panel situated within the housing and may be communicatively coupled to the controller. The display panel may provide a visual signal that indicates a real-time position of the restrictor valve such that a user can quickly and effectively determine whether the restrictor valve is open or closed. The display panel may employ indicia or light emitting diodes of various colors to quickly inform the user of the valve's status.

It is a further intent of the present invention to provide a method for regulating water traveling through an existing water supply line. Such a method may include the steps of first providing a housing adapted to be in fluid communication with the existing water supply line and an existing external power supply. The housing may be manufactured to be easily attached and detached to water supply lines of various sizes. Next, the method may include providing and communicatively coupling a user interface to the housing and the existing external power supply. The housing preferably may be positioned in a location convenient for easy user access thereto.

Third, the method may include automatically preventing water from flowing downstream of the housing upon detection of at least one triggering event. A first triggering event of the at least one triggering event may be detected when the external power supply is interrupted. A second triggering event of the at least one triggering event may be programmable and selectively adjusted based upon a user input. The second triggering event may be detected when a real-time water flow rate exceeds a maximum threshold water flow rate within the existing water supply line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
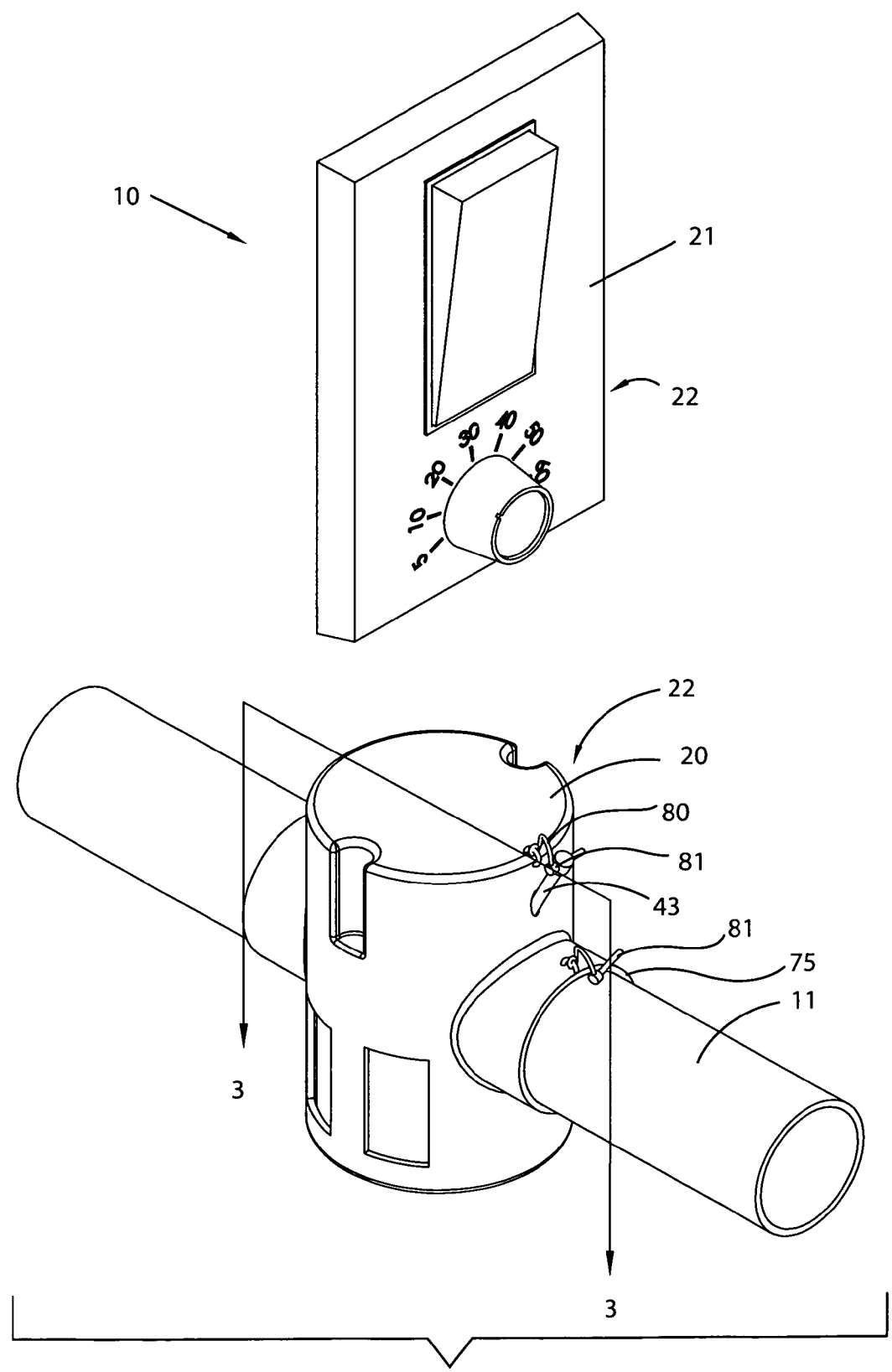
FIG. 1 is a perspective view of a water flow control system showing the housing and the detached user interface, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-4 by the reference numeral 10 and is intended to provide a water flow control system. It should be understood that the system 10 may be used for regulating water traveling through many different types of existing water supply lines and should not be limited in use to the applications mentioned herein.

Figure 2:
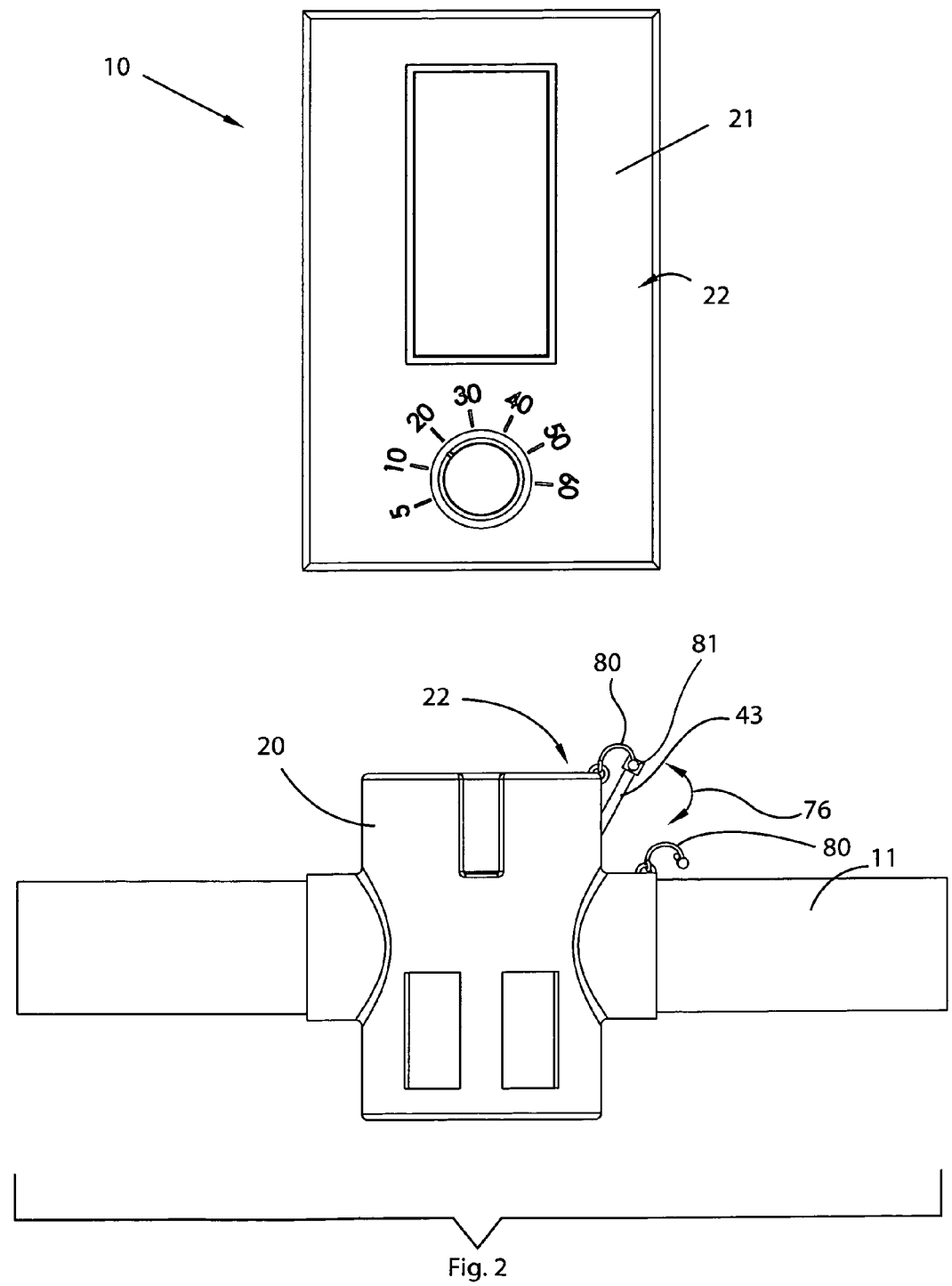
FIG. 2 is a front elevational view of the water flow control system showing the housing and the detached user interface, in accordance with the present invention.
Figure 3:
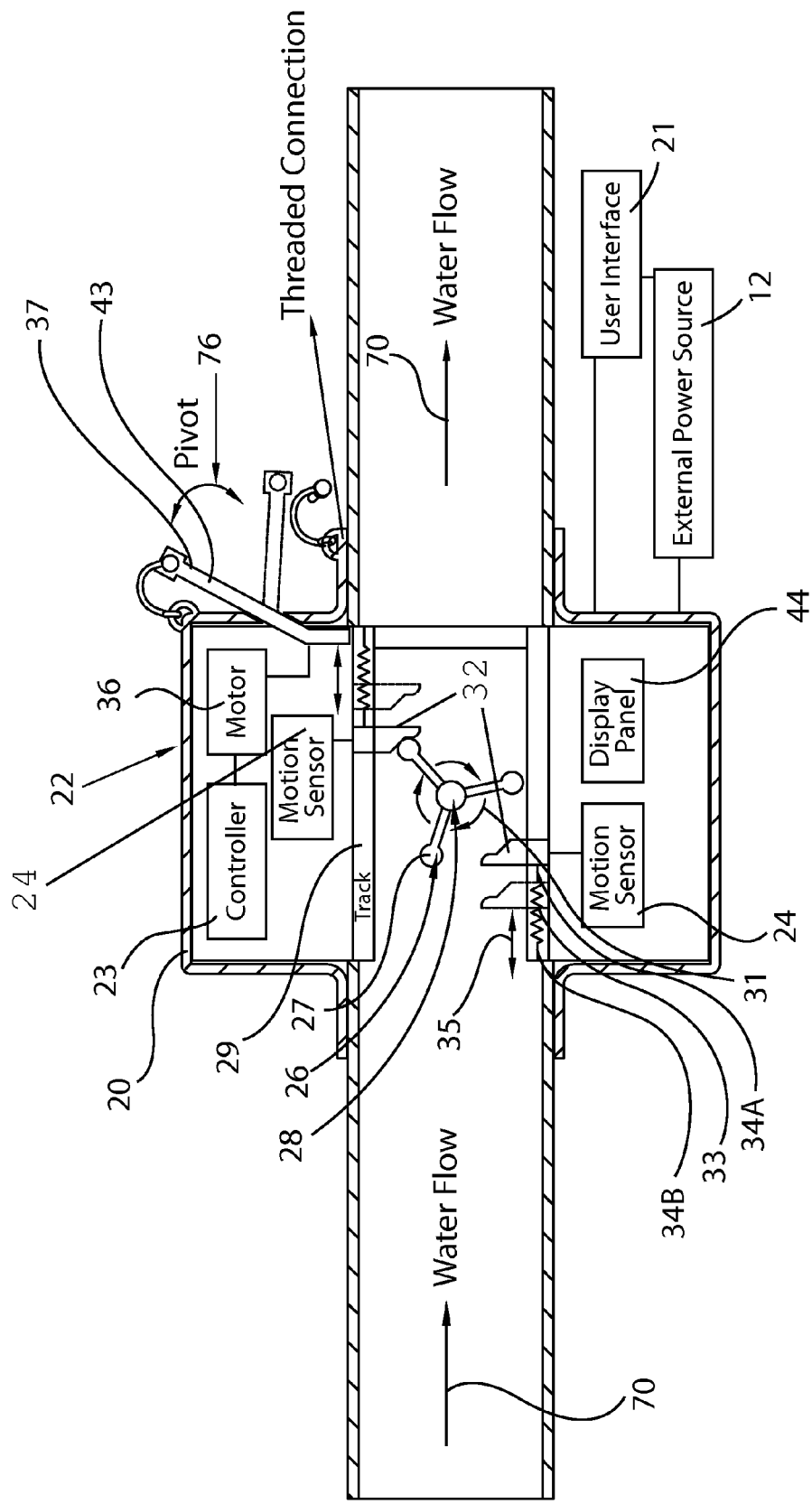
FIG. 3 is cross sectional view of the water flow control system showing the automatic water flow preventing mechanism, taken along line 3-3, as seen in FIG. 1.

Referring initially to FIGS. 1-3, a water flow control system 10 for regulating water traveling through an existing water supply line preferably includes a housing 20 adapted to be in fluid communication with the existing water supply line 11 and an existing external power supply 12. The housing 20 may include a threaded connection 75 for attaching to the existing water supply line 11. The system 10 may be manufactured to adapt to a variety of water lines so that a user may use the system 10 with dishwashers, washing machines, ice makers and the like.

The system 10 further may include a user interface 21 communicatively coupled to the housing 20 and the existing external power supply 12. Such a user interface 21 may be situated exterior of the housing 20 and spaced therefrom. One skilled in the art recognizes that the user interface 21 may be located either in close proximity to the housing 20 or far away therefrom. For example, the user interface 21 may be advantageously placed on an interior wall of the building to allow the user to conveniently set the water supply settings without having to crawl into tight spaces or under cabinets to adjust or shut off the water supply.

Figure 4:
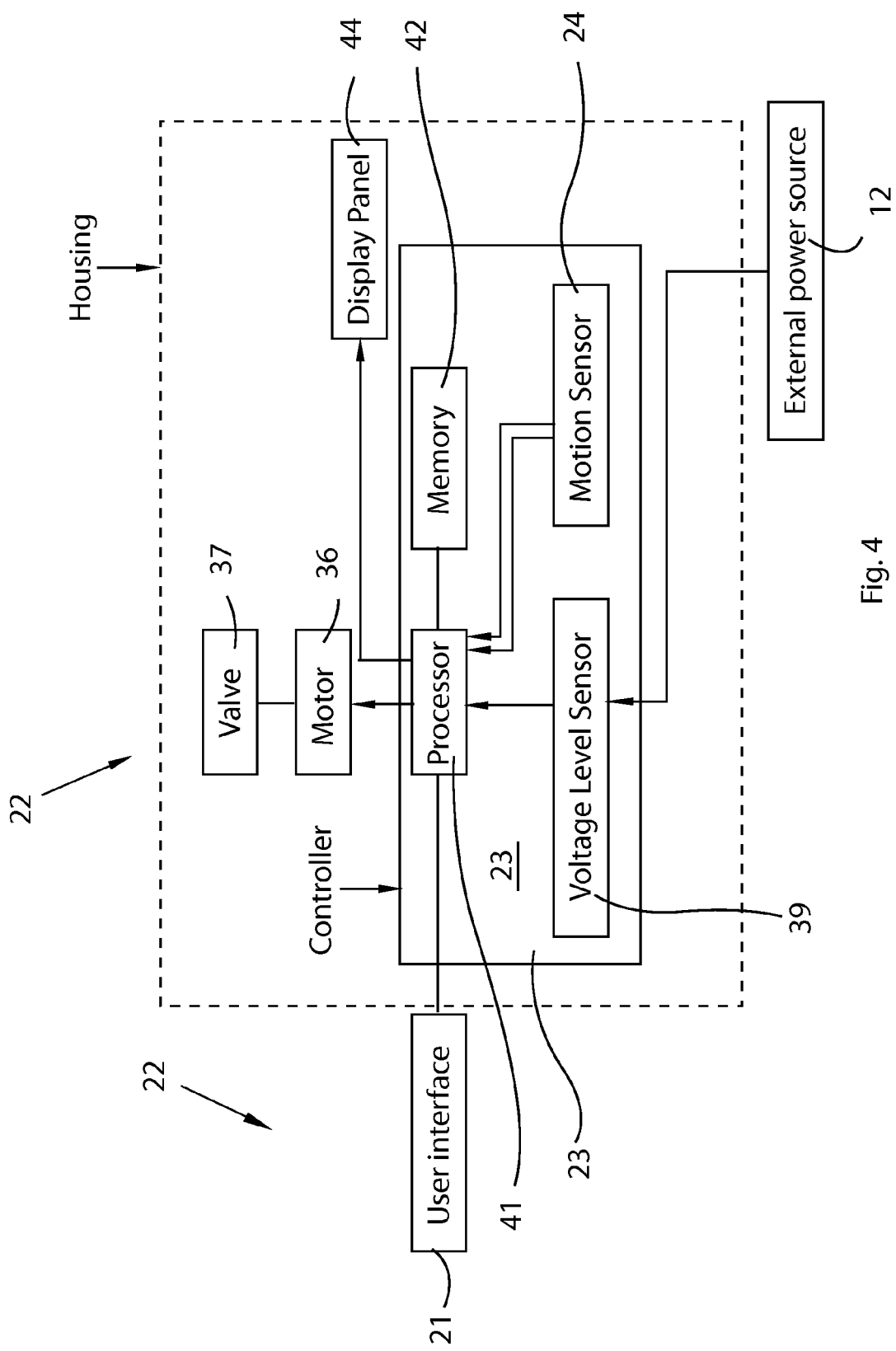
FIG. 4 is a schematic block diagram of the water flow control system, in accordance with the present invention.

Referring to FIGS. 3-4, the system 10 may further include a mechanism 22 for automatically preventing water from flowing downstream of the housing upon detection of at least one triggering event. A first triggering event may be detected when the external power supply 12 is interrupted. In this manner, the mechanism 22 may prevent flooding or water overflow during a power outage caused by natural disasters. Another triggering event may be preferably programmable and selectively adjusted based upon a user input. Such a triggering event may be detected when a real-time water flow rate exceeds a maximum threshold water flow rate within the existing water supply line 11.

For example, the user may employ the present invention to prevent an appliance from leaking and causing property damage to an existing home. First the user may determine the normal rate of water flow for a given appliance. Then the user may program the system 10 to prevent water from flowing to that appliance when the rate exceeds the normal rate of water flow. In the event of a plumbing leak in the appliance, the rate of water flow will exceed that of the programmed rate, thereby causing the system 10 to discontinue water flow to that appliance. The discontinuance of water flow to the appliance will alert the user to the water leak. Thus, the user may repair the leak before flowing water causes damage to the surrounding structure.

Referring to FIGS. 3-4, the automatic water flow preventing mechanism 22 may include a controller 23 situated within the housing 20 and may be communicatively coupled to the user interface 21. In addition, a plurality of motion sensors 24 may be situated within the housing 20 and may be communicatively coupled to the controller 23. Further, the user interface 21 may generate a calibration signal based upon receipt of a user input for adjusting the maximum threshold water flow rate associated with the second triggering event. This permits the user to selectively modify the maximum threshold water flow rate as desired.

Referring to FIGS. 3-4, the automatic water flow preventing mechanism 22 further may include a rotatable fan 26 situated within the housing 20 and adapted to be centrally aligned along a travel path 70 of the water flowing within the existing water supply line 11. Such a fan 26 preferably includes a plurality of rotatable blades 27 equidistantly offset from a center 28 of the fan 26. Additionally, a plurality of tracks 29 may be formed within the housing 20 and oppositely spaced apart from a rotational path 31 of the blades 27. Also, a plurality of triggers 32 may be slidably attached to the tracks 29 respectively.

Referring to FIGS. 3-4, the automatic water flow preventing mechanism 22 may further include a plurality of resilient spring members 33. Such a plurality of resilient spring members 33 preferably are included and have first 34A and second 34B ends anchored to the triggers 32 and a corresponding end of the tracks 29 respectively. The fan 26 may advantageously be caused to rotate as water flows downstream of the housing 20 along the travel path 70 such that a rotational speed of the fan 26 is commensurate with the real-time water flow rate. The blades 27 may sequentially engage the triggers 32 while traveling along the rotational path 31, thereby linearly urging the triggers 32 along mutually exclusive longitudinal paths 35 registered parallel to the travel path 70. In addition, the spring members 33 may be reciprocated between compressed and equilibrium positions such that the triggers 32 are automatically returned to a resting position after being linearly urged to a displaced position.

Referring to FIGS. 3-4, the automatic water flow preventing mechanism 22 further may include a motor 36 situated within the housing 20 and may be communicatively coupled to the controller 23. In addition, a restrictor valve 37 may be situated within the housing 20 and may be disposed downstream of the triggers 32 respectively. Such a restrictor valve 37 may be driven by the motor 36. Also, a voltage level sensor 39 may be electrically coupled to the existing external power supply 12. The voltage level sensor 39 may generate true and false voltage level signals when the existing external power supply 12 is uninterrupted and interrupted respectively. The combined elements of the motor 36 and the voltage level sensor 39 provide the unexpected benefit wherein the restrictor valve 37 may be displaced to a lowered position when the external power supply 12 is interrupted. This precautionary feature prevents water overflow when power is unavailable.

Referring to FIGS. 3-4, the controller 23 may include a processor 41 and a memory 42 electrically coupled to the processor 41. Such a memory 42 may include programmable software instructions including a control logic algorithm that causes the motor 36 to automatically drive the restrictor valve 37 along a linear path traversing the travel path 70 of water. Additionally, the motion sensors 24 may be positioned along the longitudinal paths to thereby detect a number of times a corresponding one of the triggers 32 is linearly urged along the longitudinal paths. The motion sensors 24 effectively generate a detection signal upon detecting linear movement of the triggers 32 respectively.

The control logic algorithm may include and execute the steps of preferably first requesting receipt of the voltage level signal. Next, the algorithm may determine whether the voltage level signal is true or false. If the voltage level signal is true, the algorithm may next include the step of requesting a user to set the maximum threshold flow rate to a desired level via the user interface 21.

A fourth step of the algorithm may include continuously requesting receipt of the detection signals from the motion sensors 24. Fifth, the algorithm may calculate an average number of times that the triggers 32 have been linearly urged along the longitudinal paths 35 within a selected time interval. Sixth, the algorithm may calculate the real-time water flow rate by dividing the average number of times that the triggers 32 have been linearly urged along the longitudinal paths 35 by the selected time interval. Finally, if the real-time water flow rate is greater than the maximum threshold water flow rate, then the algorithm may generate and transmit a control signal to the motor 36 for displacing the restrictor valve 37 to a closed position. The algorithm thereby operates the restrictor valve 37 to prevent an overflow of water based on the maximum rate of water flow the user finds allowable.

Referring to FIGS. 1-4, the automatic water flow preventing mechanism 22 further may include a manually-actuated lever 43 operably attached to the restrictor valve 37 and protruding outwardly from the housing 20. Such a lever 43 may be selectively pivoted between raised and lowered positions along a mutually exclusive arcuate path 76 for causing the restrictor valve 37 to toggle between the open and closed positions respectively. The lever 43 thereby operates as a backup system, and is desirable should any problem occur with the electrical components of the valve 37 or the power source 12.

Referring to FIGS. 1-3, a plurality of cords 80 may be affixed to the exterior of the housing 20. Each of such cords 80 may include a pin 81 at a distal end thereof. The cords 80 may be anchored to the housing 20 in close proximity to the lever 43 which is vital for securing the lever 43 at a raised or lowered position by attaching one of the pins 81 to the lever 43. In this manner, the cords 80 prevent the lever from inadvertently toggling between raised and lowered positions.

Referring to FIGS. 3-4, the automatic water flow preventing mechanism 22 further may include a display panel 44 situated within the housing 20 and may be communicatively coupled to the controller 23. The display panel 44 may provide a visual signal that indicates a real-time position of the restrictor valve 37 such that a user can quickly and effectively determine whether the restrictor valve 37 is open or closed. The display panel 44 may employ indicia or light emitting diodes of various colors to quickly inform the user of the valve's status. This simultaneously alerts the user that either a maximum threshold flow rate of water has been reached or that the external power supply 12 has been interrupted.

In use, a method for regulating water traveling through an existing water supply line may include the first step of providing a housing 20 adapted to be in fluid communication with the existing water supply line 11 and an existing external power supply 12. The housing 20 may be manufactured to be easily attached and detached to water supply lines of various sizes. Next, the method may include providing and communicatively coupling a user interface 21 to the housing 20 and the existing external power supply 12. The housing 20 preferably may be positioned in a location convenient for easy user access.

In use, the method may further include automatically preventing water from flowing downstream of the housing 20 upon detection of at least one triggering event. A first triggering event may be detected when the external power supply 12 is interrupted. A second triggering event may be programmable and selectively adjusted based upon a user input into the user interface 21. The second triggering event may be detected when a real-time water flow rate exceeds a maximum threshold water flow rate within the existing water supply line.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A water flow control system for regulating water traveling through an existing water supply line, said water flow control system comprising:

a housing adapted to be in fluid communication with the existing water supply line and an existing external power supply;

a user interface communicatively coupled to said housing and the existing external power supply; and means for automatically preventing water from flowing downstream of said housing upon detection of at least one triggering event;

wherein a first triggering event of said at least one triggering event is detected when the external power supply is interrupted;

wherein a second triggering event of said at least one triggering event is programmable and selectively adjusted based upon a user input, said second triggering event being detected when a real-time water flow rate exceeds a maximum threshold water flow rate within the existing water supply line;

wherein said automatic water flow preventing means comprises a controller situated within said housing and being communicatively coupled to said user interface; and a plurality of motion sensors situated within said housing and being communicatively coupled to said controller;

wherein said user interface generates a calibration signal based upon receipt of a user input for adjusting said maximum threshold water flow rate associated with said second triggering event and thereby permitting the user to selectively modify said maximum threshold water flow rate as desired;

wherein said automatic water flow preventing means further comprises a rotatable fan situated within said housing and adapted to be centrally aligned along a travel path of the water flowing within the existing water supply line, said fan including a plurality of rotatable blades equidistantly offset from a center of said fan;

a plurality of tracks formed within said housing and oppositely spaced apart from a rotational path of said blades;

a plurality of triggers slidably attached to said tracks respectively; and a plurality of resilient spring members having first and second ends anchored to said triggers and a corresponding end of said tracks respectively;

wherein said fan is caused to rotate as water flows downstream of said housing along said travel path such that a rotational speed of said fan is commensurate with said real-time water flow rate;

wherein said blades sequentially engage said triggers while traveling along said rotational path and thereby linearly urging said triggers along mutually exclusive longitudinal paths registered parallel to said travel path, said spring members being reciprocated between compressed and equilibrium positions such that said triggers are automatically returned to a resting position after being linearly urged to a displaced position.

2. The water flow control system of claim 1, wherein said automatic water flow preventing means further comprises:

a motor situated within said housing and being communicatively coupled to said controller;

a restrictor valve situated within said housing and being disposed downstream of said triggers respectively, said restrictor valve being driven by said motor; and a voltage level sensor electrically coupled to the existing external power supply, said voltage level sensor generating true and false voltage level signals when the existing external power supply is uninterrupted and interrupted respectively.

3. The water flow control system of claim 2, wherein said controller comprises:

a processor; and a memory electrically coupled to said processor, said memory including programmable software instructions including a control logic algorithm that causes said motor to automatically drive said restrictor valve along a linear path traversing said travel path of water;

wherein said motion sensors are positioned along said longitudinal paths and thereby detect a number of times a corresponding one of said triggers is linearly urged along said longitudinal paths, said motion sensors generating a detection signal upon detecting linear movement of said triggers respectively.

4. The water flow control system of claim 3, wherein said control logic algorithm comprises and executes the steps of:

a. requesting receipt of said voltage level signal;

b. determining whether said voltage level signal is true or false;

c. if said voltage level signal is true, requesting a user to set said maximum threshold flow rate to a desired level via said user interface;

d. continuously requesting receipt of said detection signals from said motion sensors;

e. calculating an average number of times that said triggers have been linearly urged along said longitudinal paths within a selected time interval;

f. calculating said real-time water flow rate by dividing said average number of times that said triggers have been linearly urge along said longitudinal paths by said selected time interval; and g. if said real-time water flow rate is greater than said maximum threshold water flow rate, then generating and transmitting a control signal to said motor for displacing said restrictor valve to a closed position.

5. The water flow control system of claim 4, wherein said automatic water flow preventing means further comprises:

a manually-actuated lever operably attached to said restrictor valve and protruding outwardly from said housing, said lever being selectively pivoted between raised and lowered positions for causing said restrictor valve to toggle between said open and closed positions respectively.

6. The water flow control system of claim 5, wherein said automatic water flow preventing means further comprises:

a display panel situated within said housing and being communicatively coupled to said controller, said display panel providing a visual signal that indicates a real-time position of said restrictor valve such that a user can quickly and effectively determine whether said restrictor valve is open or closed.

7. A water flow control system for regulating water traveling through an existing water supply line, said water flow control system comprising:

a housing adapted to be in fluid communication with the existing water supply line and an existing external power supply;

a user interface communicatively coupled to said housing and the existing external power supply, said user interface being situated exterior of said housing and spaced therefrom; and means for automatically preventing water from flowing downstream of said housing upon detection of at least one triggering event;

wherein a first triggering event of said at least one triggering event is detected when the external power supply is interrupted;

wherein a second triggering event of said at least one triggering event is programmable and selectively adjusted based upon a user input, said second triggering event being detected when a real-time water flow rate exceeds a maximum threshold water flow rate within the existing water supply line;

wherein said automatic water flow preventing means comprises a controller situated within said housing and being communicatively coupled to said user interface; and a plurality of motion sensors situated within said housing and being communicatively coupled to said controller;

wherein said user interface generates a calibration signal based upon receipt of a user input for adjusting said maximum threshold water flow rate associated with said second triggering event and thereby permitting the user to selectively modify said maximum threshold water flow rate as desired;

wherein said automatic water flow preventing means further comprises a rotatable fan situated within said housing and adapted to be centrally aligned along a travel path of the water flowing within the existing water supply line, said fan including a plurality of rotatable blades equidistantly offset from a center of said fan;

a plurality of tracks formed within said housing and oppositely spaced apart from a rotational path of said blades;

a plurality of triggers slidably attached to said tracks respectively; and a plurality of resilient spring members having first and second ends anchored to said triggers and a corresponding end of said tracks respectively;

wherein said fan is caused to rotate as water flows downstream of said housing along said travel path such that a rotational speed of said fan is commensurate with said real-time water flow rate;

wherein said blades sequentially engage said triggers while traveling along said rotational path and thereby linearly urging said triggers along mutually exclusive longitudinal paths registered parallel to said travel path, said spring members being reciprocated between compressed and equilibrium positions such that said triggers are automatically returned to a resting position after being linearly urged to a displaced position.

8. The water flow control system of claim 7, wherein said automatic water flow preventing means further comprises:
   a motor situated within said housing and being communicatively coupled to said controller;
   a restrictor valve situated within said housing and being disposed downstream of said triggers respectively, said restrictor valve being driven by said motor; and
   a voltage level sensor electrically coupled to the existing external power supply, said voltage level sensor generating true and false voltage level signals when the existing external power supply is uninterrupted and interrupted respectively.

9. The water flow control system of claim 8, wherein said controller comprises:
   a processor; and
   a memory electrically coupled to said processor, said memory including programmable software instructions including a control logic algorithm that causes said motor to automatically drive said restrictor valve along a linear path traversing said travel path of water;
   wherein said motion sensors are positioned along said longitudinal paths and thereby detect a number of times a corresponding one of said triggers is linearly urged along said longitudinal paths, said motion sensors generating a detection signal upon detecting linear movement of said triggers respectively.

10. The water flow control system of claim 9, wherein said control logic algorithm comprises and executes the steps of:
   a. requesting receipt of said voltage level signal;
   b. determining whether said voltage level signal is true or false;
   c. if said voltage level signal is true, requesting a user to set said maximum threshold flow rate to a desired level via said user interface;
   d. continuously requesting receipt of said detection signals from said motion sensors;
   e. calculating an average number of times that said triggers have been linearly urged along said longitudinal paths within a selected time interval;
   f. calculating said real-time water flow rate by dividing said average number of times that said triggers have been linearly urge along said longitudinal paths by said selected time interval; and
   g. if said real-time water flow rate is greater than said maximum threshold water flow rate, then generating and transmitting a control signal to said motor for displacing said restrictor valve to a closed position.

11. The water flow control system of claim 10, wherein said automatic water flow preventing means further comprises:
   a manually-actuated lever operably attached to said restrictor valve and protruding outwardly from said housing, said lever being selectively pivoted between raised and lowered positions for causing said restrictor valve to toggle between said open and closed positions respectively.

12. The water flow control system of claim 11, wherein said automatic water flow preventing means further comprises:
   a display panel situated within said housing and being communicatively coupled to said controller, said display panel providing a visual signal that indicates a real-time position of said restrictor valve such that a user can quickly and effectively determine whether said restrictor valve is open or closed.

* * * * *